April 4, 1961 C. A. GAGNE 2,977,742
AUTOMATIC GRASS TRIMMER
Filed Nov. 14, 1958 2 Sheets-Sheet 2
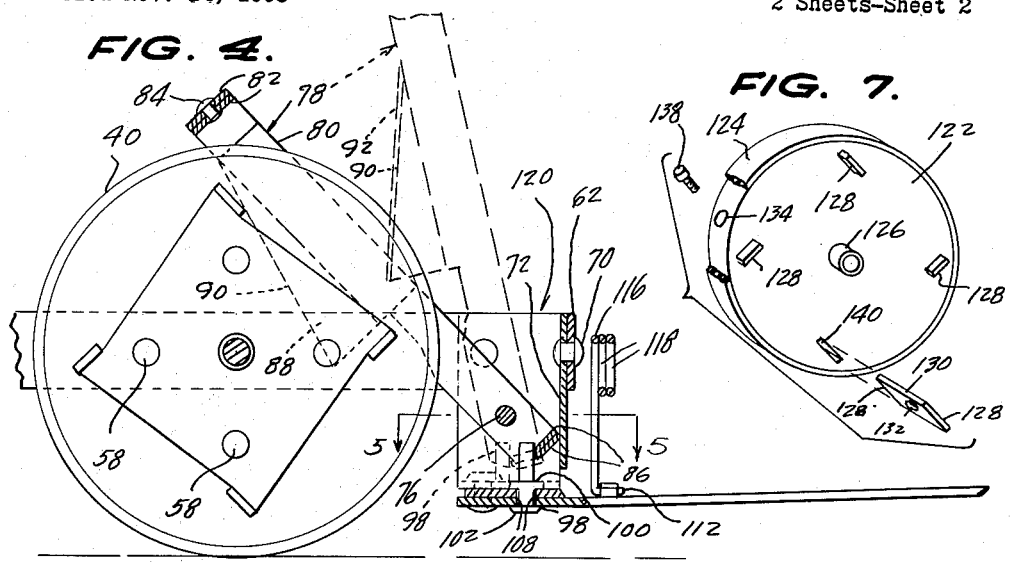
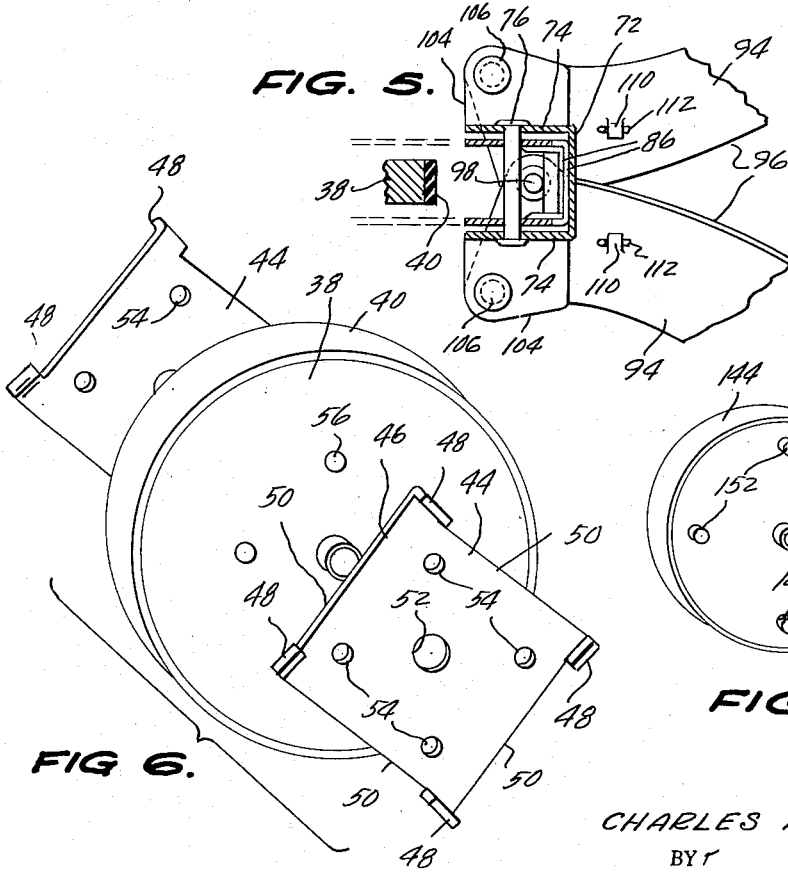
INVENTOR.
CHARLES A. GAGNE,
BY
McMorrow, Berman + Davidson
ATTORNEYS.

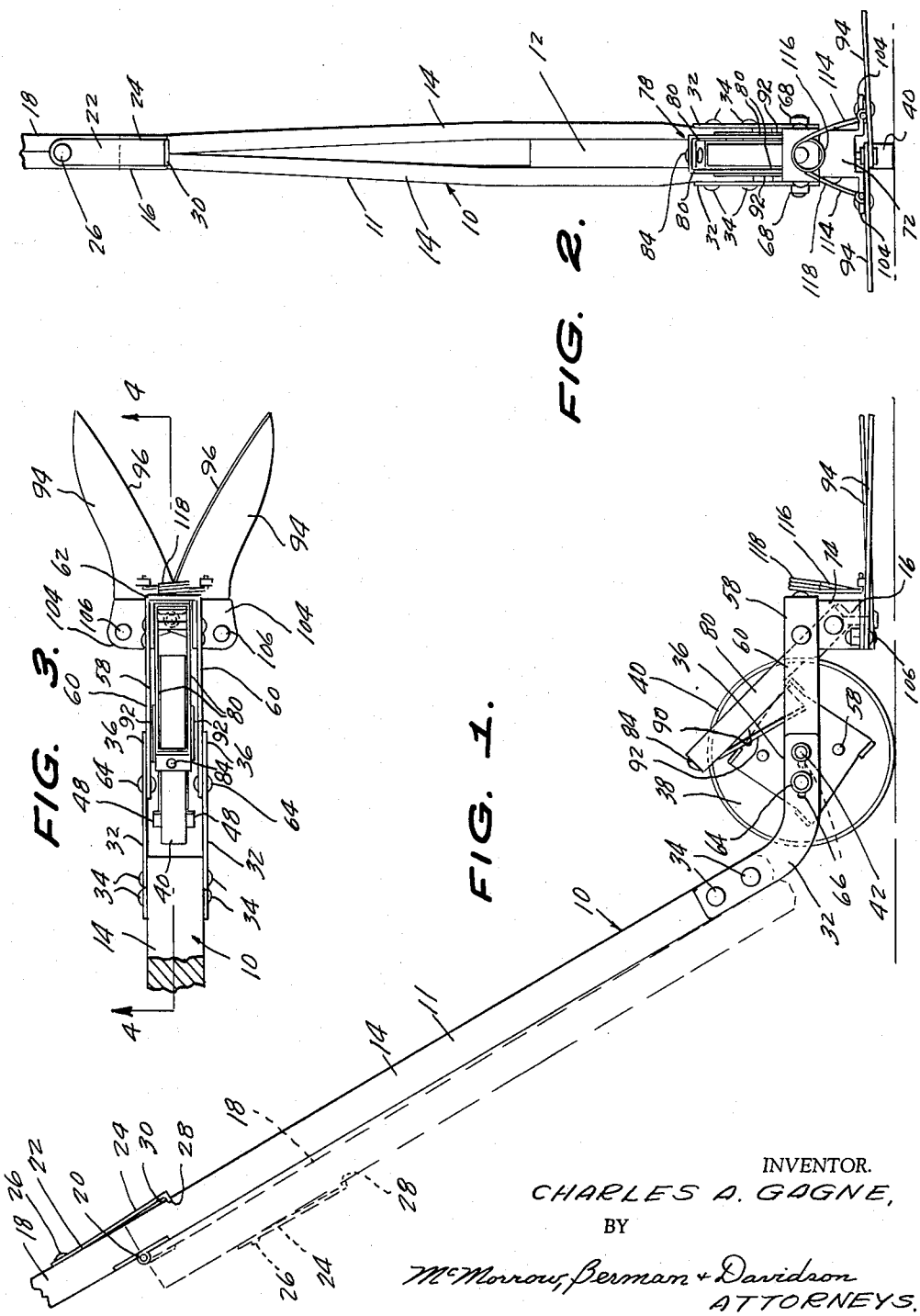

United States Patent Office 2,977,742
Patented Apr. 4, 1961

2,977,742

AUTOMATIC GRASS TRIMMER

Charles A. Gagne, 20 Prospect St., Biddeford, Maine

Filed Nov. 14, 1958, Ser. No. 773,917

6 Claims. (Cl. 56—241)

This invention relates generally to the manufacture of grass trimming devices and related mechanisms. More particularly, the invention is an improved lawn edger. A device of this type is used along the edges of walks, flower beds, etc., to neatly trim the grass at these locations.

The main object is to provide a generally improved lawn edging device which will require a minimum amount of effort on the part of the user, in relation to the overall cost of the device.

A more particular object is to incorporate means in the device that will cause automatic opening and closing of the shear blades in response to rotation of the ground wheel.

A further object is to provide a simplified construction for a grass trimmer or lawn edging device, which will be designed to permit manufacture of the same at a very low cost.

Still another object is to provide a device of the character stated which will not only be simple to operate, but also, will be very light and compact.

A further object is to so form the device as to eliminate stooping, that is, the device is designed to permit operation by one walking in an erect position.

Another object is to effect the operation of the shearing blades between their opened and closed positions, without requiring any motion of the user's hands. The user, thus, need merely grip the handle and move the device in a forward direction along the lawn edge that is to be trimmed.

Another object is to provide a novel motion-translating linkage, in a device of the character stated, whereby rotation of the ground wheel will effect opposite, simultaneous pivotal movement of horizontally disposed shearing blades.

Still another object is to provide a device of the character stated which will be durable, sure in operation, and adapted for trouble-free operation over a long period of time.

Other objects will appear from the following description, the claims appended thereto, and from the annexed drawing in which like reference characters designate like parts throughout the several views and wherein:

Figure 1 is a side elevational view of a lawn edger according to the present invention, a portion of the handle being broken away, the handle being shown in dotted lines in its folded position;

Figure 2 is a front elevational view of the device, with the upper portion of the handle broken away;

Figure 3 is a fragmentary top plan view;

Figure 4 is an enlarged longitudinal section substantially on line 4—4 of Figure 3;

Figure 5 is a horizontal sectional view on the same scale as Figure 4, taken substantially on line 5—5 of Figure 4;

Figure 6 is an exploded perspective view of the ground wheel and of the actuating plates carried thereby;

Figure 7 is an exploded perspective view, portions being broken away, of a modified form of ground wheel having actuating lugs of flat formation mounted thereon; and Figure 8 is a view like Figure 7 showing another modification of a ground wheel having lugs of circular cross section.

Referring to the drawing in detail, a handle generally designated 10 included an elongated, straight lower portion 11, said lower portion comprising at its lower end a longitudinally, centrally extending, straight spacer bar 12 (Figure 2) at opposite sides of which are identical but opposite side portions 14. Side portions 14 are fixedly secured to the spacer bar 12, and project upwardly from the spacer bar as shown in Figure 2, said side portions gradually converging and being made rigid with each other as at 16, at their upper, convergent ends.

The handle 10 also includes an upper handle portion 18, which in use extends in longitudinal alignment with the lower portion as shown in full lines in Figure 1. The portion 18, when the device is not in use, folds into side-by-side relation to the lower portion 14, as shown in dotted lines in Figure 1.

The handle portion 18 has a hinge connection 20 at its lower end to the upper end of the lower portion 14, about which the upper portion swings between operative and inoperative positions shown in full and dotted lines, respectively, in Figure 1. When the portion 18 is in its upwardly swung, operative position, a detent 22 in the form of a flat leaf spring 24 is used to releasably retain the upper portion in its use position.

The elongated leaf spring detent is connected at one end by a rivet 26 or equivalent fastening means to the handle portion 18. The other end of the detent has a transverse lip 28 adapted to engage in a complementary notch 30 formed in and extending transversely of the lower handle portion.

The detent is adapted to rotate about the fastening element 26, on an axis that extends transversely of the handle portion 18 from the front to the back of the handle portion. In other words, the detent 22 can swing from the dotted line position shown in Figure 1, in which the lip 28 thereof is spaced well inwardly along the length of portion 18 from the hinge 20. It swings to a use position of the detent angularly spaced 180° from the dotted line position thereof shown in Figure 1. In the use position of the detent, it projects beyond the hinged end of the handle portion 18, so as to overlie and releasably engage in the handle portion 14.

At opposite sides of the lower end of the handle portion 14, identical, obtusely-angular frame plates 32 are fixedly secured by rivets 34 to the handle portion 11. When the handle is in its inclined, use position shown in Figure 1, the front end portions 36 of the plates 32 will project horizontally, forwardly as shown in Figure 1.

A ground wheel 38 is embraced by the forwardly projecting portions 36, and is preferably provided with a rubber tire 40. The ground wheel rotates on an axle 42 extending between the forwardly projecting portions 36 of the frame plates 32.

Referring particularly to Figures 4 and 6, secured to the opposite faces of the ground wheel 38 are identical but opposite actuating plates 44. In the form shown in Figures 1-6, each of said plates includes a rectangular body 46, on the several corners of which are integrally formed laterally outwardly projecting actuating lugs 48. Each lug extends in closely spaced, parallel relation to the edge or side 50 of the plate on which it is mounted. The plates 44 have center openings 52 through which the axle 42 may extend, and arranged about said center openings 52 are openings 54. These are in a rectangular series, there being four openings 54, one adjacent each corner of the rectangular plate. The ground wheel has similarly spaced openings 56, and rivets 58 or equivalent means are extended through the registering openings 54, 56, so that each rivet secures the plates 44 to the opposite faces of the ground wheel.

A front frame section 58 is provided, this being projected horizontally forwardly from the forward portions 36 of the frame plates 32. Frame section 58, as shown in Figure 3, is U-shaped, having flat side walls 60. Side walls 60, at their front ends, are integral with a transverse front wall 62. The side walls 60 are embraced by the forwardly projecting portions 36 of frame plates 32, and are secured to said portions 36 by means of the axle 42 which passes through openings formed in the side walls 60. Further, connecting rivets 64 are disposed adjacent the axle (see Figure 1). These extend through circular openings of the plates 36 and through slots 66 formed in the side walls 60. By tightening nuts 68 threaded upon the ends of the axle or pin 42, one can secure the frame section 58 to the frame plates 32, in selected positions of adjustment. In said positions the frame section telescopes horizontally to a selected extent within the rear portion of the frame defined by the frame plates 32.

Referring to Figure 4, secured by a front end rivet 70 to end wall 62 is a depending frame member 72, forming a downwardly projecting extension of the front wall 62, as will be clearly seen from Figure 4. Member 72 (see Figure 2) is formed with rearwardly projecting side walls 74. Extending between said side walls is a rivet 76. This forms a pivot pin for a motion-translating lever generally designated 78. Lever 78 rocks about the axis of the pin 76, between the full and dotted line positions shown in Figure 4.

The lever 78 is disposed in an inclined position, at an angle of approximately 45 degrees from the vertical, when normally positioned as in full lines in Figure 4. The lever is comprised of transversely spaced, parallel side members 80. These have overlapping, laterally inwardly projecting extensions 82 at one end (see Figure 4). Extensions 82 are connected together by rivet 84. The other ends 86 of the side portions 80 are also extended laterally inwardly toward each other into overlapping relation, and are joined. In this way, the lever comprises a relatively long element in the form of an open-center, elongated frame. Secured fixedly to and depending from the respective, connected side portions 80 are cam plates 90. Each of these has an elongated, sloped bottom edge defining a cam surface that extends obliquely to the length of the lever. Along their bottom edges, the cam plates are formed with outwardly directed, narrow, longitudinal lips 92 to eliminate the sharpness of the edges.

The overlapping front end extensions 86 of the side portions 80 of the lever form a front end wall or abutment on the lever. This abutment has a function of imparting movement to a pair of forwardly projecting shear blades 94. Blades 94 have confronting shearing or cutting edges 96 (Figure 5). At the rear ends of the cutting edges 96, the blades overlap, also as shown in Figure 5. The overlapping portions of the blades are pivotally connected by a pin 98. Pin 98 is vertically disposed, and projects upwardly a substantial distance above the blades. The pin has a collar 100 overlying the blades. Collar 100 cooperates with a head 102 formed upon the lower end of the pin, in holding the pin assembled with the blades in its proper, upstanding position.

The upwardly projecting portion of the pin is disposed in back of and in contact with the abutment at the front end of the lever 78. Therefore, when the lever rocks about its pivot 76, the front end of the lever is caused to traverse an arc about the axis of rocking movement of the lever. Said axis is disposed in close proximity to the front end of the lever. Therefore, the front end or abutment defined by the extension 86 travels through only a relatively short distance, between the full and dotted line positions shown in Figure 4. There is thus a substantial multiplication of force, at said front end of the lever. The front end of the lever engages the upstanding pin, and biases the same rearwardly. The movement of the pin is along a straight line between the full and dotted line positions of the pin 98 shown in Figure 4. The pin thus travels along a straight path. Said path extends longitudinally and centrally of the device, that is, it bisects the shear blade assembly in a longitudinal direction.

At the lower end of the frame member 72, the side walls 74 thereof are integrally formed with laterally outwardly projecting, coplanar, shear blade support flanges 104. These overlie the respective shear blades. The blades are pivotally connected to the flanges 104 outwardly from the walls 74, by transversely aligned, vertically extending rivets or pivot pins 106. The blades pivot on pins 106 when swinging between their normal open positions shown in Figure 3, and their closed positions.

It will be understood that the pin 98 extends through slots or oversized openings 108 of the respective shear blades. Thus, the pin 98 can have straight line movement despite the fact that the shear blade portions through which the pin 98 extends must obviously travel in oppositely curving paths about their respective pivots 106.

Struck upwardly out of the material of the blades 96 are lugs 110 (Figure 5). Engaged under the lugs are extensions 112. These are formed upon the lower ends of elongated, downwardly divergent legs 114 (Figure 2) of a spring 116. This has a plurality of convolutions 118 at the upper ends of the legs. The spring is tensioned to normally bias the legs 114 apart, to swing the blades to open position.

The frame plates 32, the U-shaped frame section 58, and the depending frame member 72 having side walls 74 and laterally outwardly projecting flanges 104, together constitute a support frame generally designated 120. Said support frame has a rigid connection to the handle 10, with the ground wheel being rotatably mounted upon the frame. Further, the frame carries the rockable motion-translating lever 78, the pivoted shear blades 94, and all the other movable components of the device.

In Figure 7 there is shown a modified form of ground wheel 122 having a rubber tire 124 and an axle-receiving bushing or sleeve 126. This ground wheel has actuating lugs 128 projecting laterally from its opposite faces. Corresponding actuating lugs at opposite sides of the ground wheel are defined by the laterally outwardly projecting end portions of a single, flat, rectangular lug plate 130. This has a center opening 132, aligning with a peripherally opening recess 134 of the wheel 122 to receive a connecting screw 138 threadable into said recess.

This dispenses with the plates 44, since the lugs 128 are analogous to the lugs 48. One forms slots 140 in the ground wheel, said slots extending transversely through the ground wheel. Each slot lies obliquely to the circumference of the ground wheel. Thus, on mounting of a lug plate 130 in each slot, said lug plate, at its projecting ends, will define a cam surface adapted to engage the cam surface 90.

In Figure 8 there is shown another modified form of ground wheel 142. This has a tire 144 and an axle-receiving bushing or bearing sleeve 146. Rectangularly spaced, circular, transverse, through openings 148 of this wheel receive elongated pins 150. The end portions of pins 150 project laterally outwardly in opposite directions from the opposite faces of the wheel 142. They thus form actuating lugs 152 corresponding to lugs 148 and 128.

This is a simplified construction, since the openings or bores 148 of circular cross section are readily formed in the wheel. Further, the pins need merely be tightly engaged, by press-fitting or otherwise, in the openings 48.

In use of the device, it is held in the Figure 1 position, with the handle extended ready for use. One merely moves the device forwardly. The ground wheel turns in a clockwise direction viewing the same as in Figure 1. The lugs 48, 128 or 152, as the case may be, engage the cam surface 90. The cam surface 90 is disposed obliquely to the circular path traversed by said lugs. The cam surface 90 is at increasingly shorter distance to the axis of rotation of the ground wheel, in the sense of the direction in which the lugs travel along the cam surface 90 during the rotation of the ground wheel.

Therefore, as each lug bears against the cam surface of the lever 78, it travels along said cam surface toward the high end of the cam surface. This causes the lever to be rocked from the full line to the dotted line positions shown in Figure 4. This is true since the lugs are required to travel in a circular path. Hence, they bias the lever out of said path during the regular rotation of the ground wheel.

When the lever swings to the dotted line position, rocking about its axis 76, its abutment at the forward end of the lever biases the pin 98 rearwardly from the full line to the dotted line position shown in Figure 4. Since the pin travels rearwardly, it moves rearwardly the overlapping inner edge portions of the shear blades 94. The shear blades are thus caused to pivot in opposite directions around their pivots 106, with the forwardly projecting portions of the blades moving toward each other. This creates a shearing action between the cutting edges 96, effectively trimming the grass.

As the shear blades move toward each other, they do so against the restraint of the spring, placing the spring under increased compression. As soon as the actuating lug that has been in engagement with the lever moves off the high end of the cam surface, the spring is free to expand. It immediately snaps the blades to open position. This urges the pin 98 forwardly to its normal position shown in full lines in Figure 4. The forward movement of the pin 98 of course biases the forward end of the levers counterclockwise in Figure 4, from the dotted line to the full line position of the lever. The lever thus rocks in a reverse direction back to its full line position. When the lever rocks back to its full line position, the next following lug will be disposed in position to engage the cam surface at the lower end of the cam surface. The continued forward movement of the device, with attendant rotation of the ground wheel, causes this new lug to bias the lever through another cycle of operation.

It thus becomes apparent that responsive merely to forward motion of the device along the lawn edge, the shear blades are rapidly opened and closed, to trim the grass. No exertion by the user is required, other than the inconsequential effort involved in pushing the device in a forward direction. This is accomplished with little exertion, in view of the fact that the lever offers practically no resistance to being rocked from its full line to its dotted line position of Figure 4. This is apparently true because the lever is engaged by the actuating lugs at a location spaced a substantial distance from the pivot axis of the lever. Yet, though the lever is rocked with little exertion, it exerts substantial force on the pin 98, because the part of the lever that engages the pin 98 is at a very short distance from the lever pivot pin 76.

Of course, the embodiment illustrated and described is merely typical of many that might be used, at the option of the manufacturer. One might employ bolts instead of rivets at various locations, and other obvious modifications may well be resorted to. These are considered to be sufficiently obvious, or so many in number, as not to make it proper to unduly extend the case by illustrating the same herein.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor changes in construction that may be permitted within the scope of the appended claims.

What is claimed is:

1. A lawn edger comprising a handle; frame means including a pair of transversely spaced frame plates fixed to and projecting forwardly from the handle; a single ground wheel rotatably mounted upon said plates in the space therebetween; a pair of shear blades projecting forwardly from the frame means and having rear end portions respectively pivoted on said means for swinging movement between open and closed positions about axes aligned transversely of the frame means at opposite sides of and equidistantly from the plane of rotation of the wheel; spring means engaged with the shear blades and stressed to normally bias the same to open position, said rear end portions of the blades overlapping in the space between the blade axes; a pin extending upwardly through and pivotally connecting the overlapping parts of the blades forwardly of the wheel in said plane of rotation of the wheel; a lever fulcrumed intermediate its ends upon the frame means for rocking movement in said plane, said lever including a front end portion cammingly, slidably contacting the pin and shifting the pin bodily in a direction to close the blades responsive to rocking of the lever in one direction, said lever including side portions extending in parallel, spaced relation at opposite sides of the wheel and respectively formed, adjacent the rear end of the lever, with depending cam plates disposed in close proximity to said sides of the wheel; and a series of projections angularly, uniformly spaced about the wheel axis at each side of the wheel, the projections of each series extending laterally outwardly from the adjacent side of the wheel in positions to cammingly engage the cam plate located at the same side of the wheel in successively following order, responsive to rotation of the wheel, thereby to bias the lever in said direction.

2. A lawn edger comprising a handle; frame means including a pair of transversely spaced frame plates fixed to and projecting forwardly from the handle; a single ground wheel rotatably mounted upon said plates in the space therebetween; a pair of shear blades projecting forwardly from the frame means and having rear end portions respectively pivoted on said means for swinging movement between open and closed positions about axes aligned transversely of the frame means at opposite sides of and equidistantly from the plane of rotation of the wheel; spring means engaged with the shear blades and stressed to normally bias the same to open position, said rear end portions of the blades overlapping in the space between the blade axes; a pin extending upwardly through and pivotally connecting the overlapping parts of the blades forwardly of the wheel in said plane of rotation of the wheel; a lever fulcrumed intermediate its ends upon the frame means for rocking movement in said plane, said lever including a front end portion cammingly, slidably contacting the pin and shifting the pin bodily in a direction to close the blades responsive to rocking of the lever in one direction, said lever including side portions extending in parallel, spaced relation at opposite sides of the wheel and respectively formed, adjacent the rear end of the lever, with depending cam plates lying in planes parallel to the plane of rotation of the wheel in close proximity to said sides of the wheel, said cam plates having bottom edges extending obliquely to the length of the lever to provide cam surfaces; and a series of projections angularly, uniformly spaced about the wheel axis at each side of the wheel, the projections of each series extending laterally outwardly from the adjacent side of the wheel in positions to cammingly engage the cam surface of the cam plate located at the same side of the wheel, in successively following order responsive to rotation of the wheel, so as to bias the lever in said direction.

3. A lawn edger comprising a handle; frame means including a pair of transversely spaced frame plates fixed to and projecting forwardly from the handle; a single ground wheel rotatably mounted upon said frame plates in the space therebetween, said frame means including a forward frame section mounted upon said plates for telescopic adjustment in a fore-and-aft direction in respect to the wheel; a pair of shear blades projecting forwardly from the frame means and having rear end portions respectively pivoted on said frame section for swinging movement between open and closed positions about axes aligned transversely of the frame section at opposite sides of and equidistantly from the plane of rotation of the wheel; spring means engaged with the shear blades and stressed to normally bias the same to open position, said rear end portions of the blades overlapping in the space between the blade axes; a pin extending upwardly through and pivotally connecting the overlapping parts of the blades forwardly of the wheel in said plane of rotation of the wheel; a lever carried by the forward frame section, whereby to be adjusted in respect to the wheel conjointly with said section, said lever being fulcrumed intermediate its ends upon the frame section for rocking movement in said plane, said lever including a front end portion cammingly, slidably contacting the pin and shifting the pin bodily in a direction to close the blades responsive to rocking of the lever in one direction, said lever including side portions extending in parallel, spaced relation at opposite sides of the wheel and respectively formed, adjacent the rear end of the lever, with depending cam plates lying in planes parallel to the plane of rotation of the wheel in close proximity to said sides of the wheel, said cam plates having bottom edges extending obliquely to the length of the lever to provide cam surfaces; and a series of projections carried by the wheel and angularly, uniformly spaced about the wheel axis at each side of the wheel, whereby said adjustment of the forward frame section will be effective to selectively locate the lever in respect to the projections, the projections of each series extending laterally outwardly from the adjacent side of the wheel in positions to cammingly engage the cam surface of the cam plate located at the same side of the wheel, in successively following order responsive to rotation of the wheel, so as to bias the lever in said direction.

4. A lawn edger as in claim 3, further including opposite but identical actuating plates secured to said wheel at the respective, opposite sides thereof, each of said plates including a rectangular body, the projections of each series being in the form of lugs integrally formed upon the several corners of the actuating plate located at the same side of the wheel.

5. A lawn edger as in claim 3 wherein said wheel is formed at locations angularly spaced about the margin thereof and corresponding to the locations of said projections, with transverse, through slots disposed obliquely to the wheel circumference, said slots receiving lug plates fixedly engaged in the slots, each lug plate having laterally outwardly projecting end portions with the end portions of each of the lug plates defining corresponding projections of the series disposed at opposite sides of the wheel.

6. A lawn edger as in claim 3 wherein said wheel is formed, at locations uniformly, angularly spaced about the axis of rotation thereof, with transverse, through circular openings, corresponding projections of the series disposed at opposite sides of the wheel being defined by opposite end portions of elongated pins fixedly engaged in said circular openings.

References Cited in the file of this patent

UNITED STATES PATENTS

| | | |
|---|---|---|
| 2,506,638 | Gleisen | May 9, 1950 |
| 2,811,822 | Woolf | Nov. 5, 1957 |